UNITED STATES PATENT OFFICE.

CHARLES W. WALTHER, OF SEYMOUR, CONNECTICUT.

METHOD OF PREPARING SOLDER FOR BRAZING.

SPECIFICATION forming part of Letters Patent No. 351,546, dated October 26, 1886.

Application filed September 18, 1886. Serial No. 213,905. (No specimens.)

*To all whom it may concern:*

Be it known that I, CHARLES W. WALTHER, a citizen of the United States, residing at Seymour, in the county of New Haven and State of Connecticut, have invented certain new and useful Improvements in Methods of Preparing Solder for Brazing; and I do hereby declare the following to be a full, clear, and exact description of the invention, such as will enable others skilled in the art to which it appertains to make and use the same.

It is well understood by those familiar with the manufacture of metallic tubing, either of brass or iron, that the metal to be used is furnished in long plates or strips, the edges of which are rolled together and the seam closed by brazing. For this purpose ordinary brass solder is pulverized and mixed in varying proportions with pulverized borax, sufficient water being added to make the mixture flow freely along the joint. The tubes are then heated in any suitable manner, in order to melt the solder, so that the two edges will be firmly joined together. This operation of brazing as at present performed is slow and expensive, it being possible to mix only a small quantity of the solder and the borax, as the compound quickly hardens so that it will not flow along the seam. This necessitates that the operator be kept continually preparing small quantities of solder for use, and that in use it is impossible to lay the mixture evenly upon the seam, owing to the fact that it sets so quickly. The result is that the brazed tubes are very rough and uneven at the seams, and that large quantities of solder are wasted. As it is of course essential that the completed tubes shall present a smooth and finished appearance, filing has to be resorted to to make them marketable, which is an important factor in the cost of production.

My invention has for its object to provide a mixture of brass, solder, and borax, which may be kept for any length of time, will not set or harden, and will flow freely and evenly along the joint, thus enabling me to perform the operation of brazing in a simpler, quicker, and far more perfect manner than has heretofore been possible. Another and, if possible, still more important result attained by the use of solder prepared by my improved method is that the completed joint is so even and smooth that very little filing is required, thus avoiding scratches. No solder is wasted, and the completed seam will be absolutely free from holes, as the solder flows into the joint freely and thoroughly fills up every portion of it, thus avoiding all danger of the work having to be done over again. This is a very important item, as solder prepared in the ordinary manner sets so quickly that it is impossible to charge the joint smoothly upon the outside, and, what is still more inconvenient in practice, it is impossible to insure that all portions of the joint shall be thoroughly filled with the prepared solder.

It will of course be understood that the exact proportions of solder and borax used are not of the essence of my invention, but may be varied in accordance with the judgment of the user, it being necessary that unvarying quantities of each ingredient be used in order to accomplish unvarying and satisfactory results. In practice I have found that pulverized burned borax and pulverized brass solder, mixed in the proportions of five parts of borax to forty-two parts of solder, accomplish perfectly satisfactory results.

My improved method of preparing the solder for use is as follows: Having placed the desired quantities of borax and solder together in a solid steel or iron mortar, I pound or grind and mix them together with a heavy pestle, adding water slowly, to reduce the mixture to the consistency of a paste that will flow freely. By thoroughly pounding or grinding and rubbing the ingredients together as the water is added, continuing the operation of working until the paste is absolutely free from lumps, I produce a mixture that will not set or harden, and will keep ready for use for any length of time. Should the moisture become entirely evaporated the residuum will be a cake that will readily crumble and can be easily mixed with water again; but it will not set or harden—that is, become solid—which is such a serious inconvenience in using solder prepared in the ordinary manner. It will be understood that the quantity of water used in the mixture may be varied to suit the convenience of the user. In adding water at any time it is not necessary to work the compound in a mortar, as the borax does not set or harden a second time, and the paste does not become lumpy. Water is simply added in quantities sufficient to suit the convenience of the user, and is stirred in; and even should the mixture stand for so long a time that all the moisture is dried out of it, it may be readily prepared for use again by adding water, as the cake will readily crumble and will be wholly free from lumps.

Having thus described my invention, I claim—

1. The method of preparing solder for brazing, which consists in mixing suitable proportions of pulverized brass solder and pulverized burned borax, then pounding or grinding and working the two together until the borax will not set or harden, and the mixture is wholly free from lumps, adding water slowly to make a paste.

2. The method of preparing solder for brazing, which consists, first, in mixing suitable quantities of pulverized solder and pulverized burned borax together, then pounding or grinding and working the two together until the mixture is free from lumps, adding water slowly to form a paste, and then drying the moisture from the paste, whereby cakes are formed which will keep for any length of time, but will readily crumble and mix with water again, the paste being wholly free from lumps and having no tendency whatever to set or harden.

In testimony whereof I affix my signature in presence of two witnesses.

CHARLES W. WALTHER.

Witnesses:
A. M. WOOSTER,
C. E. RUGGLES.